(12) United States Patent
Bartlett et al.

(10) Patent No.: US 8,382,134 B2
(45) Date of Patent: Feb. 26, 2013

(54) WHEEL CLAMPING ASSEMBLIES

(75) Inventors: Simon Charles Bartlett, Christchurch (NZ); Nicholas Andrew Hart, Sheffield (GB)

(73) Assignee: Eko Sport, Inc., Grand Junction, CO (US)

( * ) Notice: Subject to any disclaimer, the term of this patent is extended or adjusted under 35 U.S.C. 154(b) by 1082 days.

(21) Appl. No.: 11/629,036

(22) PCT Filed: Jun. 8, 2005

(86) PCT No.: PCT/GB2005/002268
§ 371 (c)(1),
(2), (4) Date: Mar. 17, 2008

(87) PCT Pub. No.: WO2005/120940
PCT Pub. Date: Dec. 22, 2005

(65) Prior Publication Data
US 2008/0211295 A1      Sep. 4, 2008

(30) Foreign Application Priority Data
Jun. 9, 2004   (GB) .................................. 0412858.3

(51) Int. Cl.
*B62K 25/02* (2006.01)
(52) U.S. Cl. .................................... 280/279; 301/124.2
(58) Field of Classification Search .................. 280/279, 280/276, 288; 301/111.06, 132, 110.5, 118, 301/125, 124.1, 124.2
See application file for complete search history.

(56) References Cited

U.S. PATENT DOCUMENTS

| | | | | |
|---|---|---|---|---|
| 1,857,659 A | * | 5/1932 | Reid | 301/108.1 |
| 2,323,813 A | * | 7/1943 | Fred | 301/118 |
| 3,807,761 A |   | 4/1974 | Brilando et al. | |
| 4,483,400 A | * | 11/1984 | Arndt | 172/42 |
| 4,805,941 A |   | 2/1989 | Downing et al. | |

(Continued)

FOREIGN PATENT DOCUMENTS

| | | |
|---|---|---|
| DE | 19513764 | 10/1996 |
| EP | 0890505 | 1/1999 |

(Continued)

*Primary Examiner* — Anne Marie M Boehler
(74) *Attorney, Agent, or Firm* — Jason H. Foster; Kremblas & Foster

(57) ABSTRACT

An axle assembly (310) has a longitudinal axis and first and second ends, the axle assembly configured for rotatably mounting a wheel and hub assembly on an axle portion or the axle assembly, the axle portion located between the first and second ends, the axle assembly configured for affixing to first and second structural members (301, 302), at least one of the structural members (302) comprising a substantially closed bore orifice (306) wheel mounting point or dropout, said dropout having a first side configured for the axle portion to extend therefrom when said axle assembly (310) is fixed to said point and a second side, the axle assembly (310) comprising a first fixing means (309) at the first end for releasably fixing the axle assembly (310) to the first structural member (302) and a second fixing means (311) at the second end fog releasably fixing the axle assembly (310) to the second structural member (301).

25 Claims, 10 Drawing Sheets

U.S. PATENT DOCUMENTS

| | | | |
|---|---|---|---|
| 5,441,286 A * | 8/1995 | Pozzobon | 280/11.27 |
| 5,549,315 A * | 8/1996 | Ashman | 280/279 |
| 5,630,652 A | 5/1997 | Cech | |
| 5,673,925 A * | 10/1997 | Stewart | 280/279 |
| 6,089,675 A | 7/2000 | Schlanger et al. | |
| 7,537,291 B2 * | 5/2009 | Hara | 301/124.2 |
| 2004/0084955 A1 * | 5/2004 | Denby | 301/124.2 |
| 2005/0110335 A1 * | 5/2005 | Rose et al. | 301/124.1 |

FOREIGN PATENT DOCUMENTS

| | | |
|---|---|---|
| FR | 002776612 | 10/1999 |
| GB | 0341220 | 12/1929 |
| GB | 2414971 | 12/2005 |

* cited by examiner

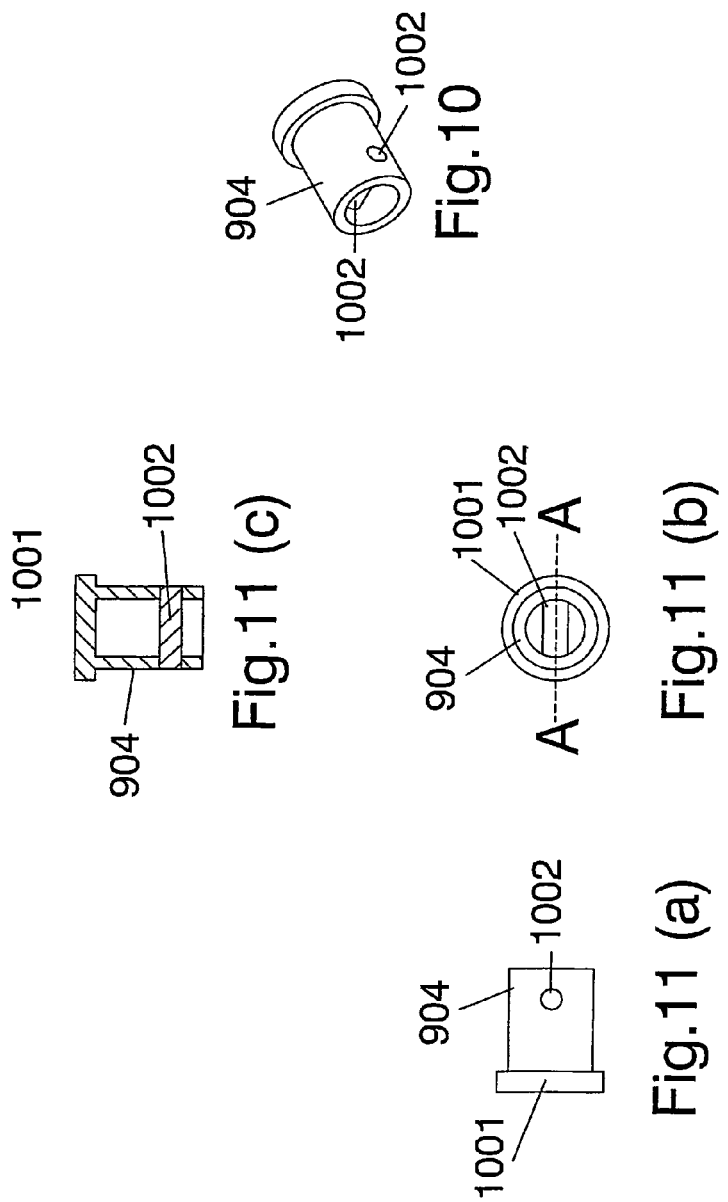

WHEEL CLAMPING ASSEMBLIES

CROSS-REFERENCES TO RELATED APPLICATIONS

This application is a submission to enter the national stage under 35 U.S.C. 371 for international application number PCT/GB2005/002268 having international filing date Jun. 8, 2005, for which priority was based upon patent application 0412858.3 having a filing date of Jun. 9, 2004 filed in Great Britain.

FIELD OF THE INVENTION

The present invention relates to wheel clamping assemblies for use in fixing an axle to a structure and particularly, although not exclusively, the invention relates to a quick release axle for use in fixing a wheel to a vehicle such as a bicycle or a motorcycle.

BACKGROUND TO THE INVENTION

Fixing devices for securing a wheel to a structure are known. Thus, for example, bicycle wheels, motorcycle wheels, trike wheels and wheels of karts, prams and the like are known to be secured by a wide variety of types of fixing devices. In the field of bicycles and motorcycles it is known to secure a wheel to a set of forks of the vehicle. A typical set of forks comprises a pair of spaced apart fork legs although in general there must be at least one fork leg. A fork is thus a structural member that is configured for affixing a wheel axle thereto. Typically for a two wheeled bicycle there is a set of front forks that comprises two fork legs to which is affixed a front wheel and there is also a pair of rear fork legs (commonly known in the art as stays) for affixing a rear wheel. The portion of the fork where the wheel is fixed thereto comprises a dropout. By a dropout it is meant a wheel mounting point, typically located at an end portion of the fork, that comprises an aperture in which a fixing may be located or applied so as to secure the wheel axle to the fork. However the term is also commonly used to also mean the aperture itself and the term is used interchangeably herein, the exact meaning being dependent upon the particular context in question as will be understood by those skilled in the art. The pair of front forks are spaced apart as are the pair of rear wheel stays. Typical dropouts have inner sides or faces (i.e. faces which face each other), outer sides that are opposite the other sides, and an orifice. A common type of dropout orifice is in the form of an elongate aperture to provide a slot for receiving a wheel axle. The dropouts of more conventional bicycles comprise slots that are located at the ends of the forks and which have an opening for receiving the axle from a direction that is more or less defined by the longitudinal axis of an associated fork leg. Such slotted dropouts enable the wheel axle to be removed from the dropouts in a direction away from the lower ends of the dropouts and these are commonly referred to in the art as open bore dropouts. It is known to secure a wheel in such open bore wheel mounting points by using an axle that is permanently fixed within a wheel hub and which comprises screw threaded end portions for affixing a threaded nut thereto, the hub being located between the inner faces of the mounting points. A first nut locates against an outer face of one of the mounting points and a second nut locates against the outer face of the second. This known type of system requires use of a tool such as a spanner to release the nuts and is thus time consuming.

Improved wheel clamping devices have been devised, which are known as "quick release" (QR) wheel clamping devices. As regards open bore type dropouts, by the term "quick release" it is meant a fixing that can be readily undone according to its intended (or primary) mode of operation by a person using only their hands and without the need to use a tool to achieve this. A lever mechanism (or other QR means) may be provided which is operable by hand so as to apply or disengage the fixing. By intended mode, in the case of a QR lever mechanism, it is meant achieving the required release of the fixing by using the lever as opposed to dismantling the fixing in some other way. In the case of quick release clamping of hub/axle assemblies in open bore dropouts it is known to be able to provide a clamping arrangement such that a lever is provided to apply (or remove) a tensional force to (or from) a spindle that passes inside the axle, the force applied effectively acting to pull the two fork legs in a direction towards one another so as to clamp them to the hub/axle assembly. A good example is disclosed in the French patent application having publication no. FR2782471. Although FR2782471 discloses a quick release wheel hub assembly it may be considered to be unnecessarily complicated in that the bearings are located in the forks rather than in the wheel hub assembly. A problem with the system disclosed in FR2782471 is that it is highly desirable to use commonly available wheels and wheel hub assemblies wherein the wheel hub itself comprises the bearings, U.S. Pat. No. 5,165,762 also discloses a form of quick release apparatus that comprises a hub having a spindle passing therethrough and to which there is attached a cam lever at a first end and an end cap located at the other end. Following positioning of the end portions of the spindle within each respective dropout the end cap is then positioned next to a first dropout and the cam lever is then used to clamp the apparatus to the forks. In normal operation of quick release wheel clamping devices of the type designed for use with open bore dropouts the axle remains intact with the hub that comprises the bearings when the wheel is removed from the forks. This is because the open bore dropouts simply allow the axle fixing to be lowered away from the dropouts when the fixing is loosened sufficiently.

Open bore dropouts are suitable for many types of bicycles and motorcycles. However the rigidity of the wheel mounting and assembly is known to be less than optimal. Increased rigidity is required in certain types of cycling/motorcycling activities where high tensional and compressional forces are applied to the vehicle. Thus in the field of mountain biking and also in the field of BMX cycling it is desired to improve the rigidity of the wheel mounting system of a given vehicle. To improve rigidity the width of the dropouts may be increased. By width it is meant the distance from the inner side (or face) to the outer side of the dropout, this being a distance measured in a direction parallel to the wheel axle. U.S. Pat. No. 6,386,643 (Marzocchi) discloses a quick releasable hub assembly of increased rigidity in that it comprises dropouts that are substantially wider than on typical cycle forks. This reference also discloses a quick-release clamping mechanism of the known hub/spindle mechanism described above. Although U.S. Pat. No. 6,386,643 provides improved rigidity, the fact that the dropouts are of the open bore type results in less than optimal rigidity as regards the securement of the wheel hub to the forks of the vehicle.

In applications such as mountain biking it is highly desirable to use dropouts that are fully or substantially closed bore. By fully closed bore it is meant a wheel mounting orifice that has a circumference of 360° at all times. However use of such fully closed bore dropouts means that the above mentioned quick release assemblies, as exemplified by U.S. Pat. No.

6,386,643, are not able to be inserted into the dropouts without substantially dismantling the axle assembly and thus losing the intended quick release effect of the quick release assembly.

A known assembly for creating a closed bore type of arrangement as used with a "quick release" hub of the type exemplified above is schematically illustrated in FIGS. 1 and 2. The system schematically illustrated in FIGS. 1 and 2 is substantially based on the fork and hub assembly disclosed in U.S. Pat. No. 6,386,643. FIGS. 1 and 2 schematically illustrate a pair of spaced apart front forks 101 and 102 each comprising respective end wheel mounting portions 103 and 104. The extended width of the dropouts is, for example, indicated for fork leg 102 between points 105 and 106 (i.e. corresponding to the approximate diameter of the axle), the extended width providing improved rigidity as compared with narrower fork dropouts that are found on more conventional bicycles. A quick release axle (as designed for use with open bore dropouts) 107 comprises a first end having a cam lever 108 and a second end comprising an end cap 109. The axle 107 is insertable in dropouts 103, 104 generally in the direction indicated by arrow 110. Following insertion in the dropouts the end cap 109 and cam lever 108 are used to cause a tensional force to be applied across the main body of the elongate axle 111 to secure the axle to the dropouts. However to improve rigidity and to secure the axle in the dropouts it is known to close the open bores of the forks. Thus as shown in FIGS. 1 and 2 a pair of plates are known to be attached to the ends of the respective dropouts, these being plates 112 and 113. Plates 112 and 113 are respectively secured to the lower ends of the dropouts by respective bolts 114 and 115. By closing the open ended dropouts using plates 112 and 113 the rigidity and the securement of the axle as held in the dropouts is improved and this is particularly desirable in mountain biking wherein cornering and maneuvering of wheels over rocks and the like causes great stresses to be put on the forks and, in particular, on the front forks. The front forks are in fact known to move relative to each other and the closed bore helps to ensure that the axle does not move within the dropouts and therefore it helps to ensure that the forks do not move relative to each other. A problem with the fork/axle assembly schematically illustrated in FIGS. 1 and 2 is that it is difficult and time consuming to remove and replace the axle from/to the open bore dropouts in view of the need to respectively remove and replace the plates. Also the person riding the particular vehicle is required to carry specific tools to effect tightening or loosening of the small bolts 114 and 115 in the event that a wheel is being respectively fitted or removed. A further problem is that frequently the bolts or plates may be lost or damaged during removal of a wheel or insertion of a wheel into the fork dropouts. Open bore dropouts configured to be closed when in use may be suitably referred to as semi-permanent closed bore dropouts in that they are not closed at all times.

In view of the problems associated with the fork/axle assembly schematically illustrated in FIGS. 1 and 2 it is desirable to provide an improved axle/fork assembly that benefits from use of closed bore dropouts. Unlike traditional bicycles, axles used in sports such as mountain biking may have a greater diameter, again for purposes of providing greater rigidity and strength of the axle/fork assembly. Typically such higher rigidity axles are greater than 9 mm in diameter and in general they are at least 20 mm in diameter. Thus the axle main body 111 schematically illustrated in FIGS. 1 and 2 is 20 mm in diameter as is common in mounting the front wheels of mountain bikes. In order to hold an axle rigidly in one or more dropouts it is highly desirable to use closed bore dropouts, the most rigid system comprising dropouts that are fully closed bore in that the dropout orifices simply comprise holes having a full 360° circumference. A fully closed bore dropout thus does not comprise a slit which would render the orifice as not encircling the axle by a full 360°. By making use of fully closed bore dropouts or near closed bore dropouts (that is dropouts which substantially encircle the axle, but which comprise a gap in the wall of the dropout orifice, the gap constituting less than 180° of angular measure around the circumference of the axle) effectively means that the axle cannot be inserted in the dropouts in the usual manner. The term "substantially closed bore" is used hereinafter to refer to fully closed bore dropouts and/or near closed bore dropouts. A property of such substantially closed bore dropouts is that the axle must, at least during normal placement or removal of the axle assembly to be from the substantially closed bore, be inserted in a direction substantially parallel to the longitudinal axis that is defined by the axle when in position in the dropout(s). This is in contrast to the usual method of inserting an axle in open bore dropouts wherein, as described earlier, the axle is inserted in a direction that is transverse to the in-use position of the longitudinal axis of the axle when in position in the dropouts. Without disassembling the QR spindle system for this type of fork/axle assembly (thereby removing the spindle) it is simply not possible to fit the QR axle in to the dropouts.

Other improved high rigidity axle/fork assemblies are known, such as, for example, those retailed by the US company in the name of Rockshox Incorporated of California. One such system marketed by Rockshox is that known as the "Tullio 20 mm QR system". The Tullio system comprises a large diameter axle that is located within a pair of fork dropouts that are substantially closed bore (each dropout orifice comprises a narrow gap thereby rendering the bore as not strictly fully closed bore, but near closed bore). The gap is provided so that a cam lever located on the exterior surface of a fork dropout can be closed thereby forcing the edges of the slit towards each other and thereby ensuring that the axle is held rigidly in each of the fork dropouts. In this system the cam levers are mounted on the fork dropouts and not on the actual axle assembly.

Rockshox Inc. have also developed a further 20 mm QR system which incorporates a cam lever on the axle assembly (rather than on a fork) and which is used to effect expansion of a member within the axle portion of the axle assembly, the expansion thereby ensuring that an end portion of the axle is held tightly within the dropout. In this single cam lever system a first end of the axle assembly is first screwed into one of the fork dropouts and once the first end of the axle is firmly in place, the second end comprising the cam lever is used to effect expansion of the expansion member to thereby secure both first and second ends within their respective dropouts. Unlike the system schematically illustrated in FIGS. 1 and 2 the two aforementioned Rockshox systems are configured such that the axle itself is removed from a given wheel hub through which it passes, this being necessary by virtue of either a substantially or a completely closed bore constraint of the forks/stays for which the system is configured to be used. Removal of the axle is in a direction parallel to the longitudinal axis of the axle when the axle is in its operational position in the hub.

In relation to clamping assemblies configured for use with substantially closed bore dropouts the requirements for an assembly to qualify as "quick release" are therefore that:
 (a) it does not require use of a special tool, such as a spanner
   i.e. it is readily operated, in its normal intended mode of operation, by hand; and (b) in its normal mode of operation it is configured to enable an axle portion of the clamping assembly to be inserted through and removed from a substantially closed bore dropout in the direction of the longitudinal axis of the axle.

Although an open bore dropout QR system of the type discussed earlier could be dismantled and then fitted through a closed bore dropout system it would be time consuming and there is the risk of loss of and/or damage to the separated components. Such dismantling of a system would not be operated as primarily intended (to quickly remove a wheel from a structure to which the wheel is attached) and is thus not considered to constitute a quick release mechanism in relation to such closed bore use.

In contrast to the axle/fork assemblies of the types described above, the axle is releasably mounted in or through a given hub to which a wheel is attached. In these latter types of axle assemblies the large diameter axle is placed in or withdrawn from the hub in a direction that is parallel to the longitudinal axis of the axle. During operation within a given hub the axle locates against one or more sealed bearings of the type in the form of a ring (usually two, one at each end of the hub). Sealed bearings of this type comprise a so-called outer race and an inner race between which there is provided a series of bearings. For the bearing to work correctly the inner race must be stationary relative to the axle. The outer race is configured to move relative to the inner race during hub movement. To prevent the inner race from moving relative to the axle a force is applied longitudinally (that is in the direction of the longitudinal axis of the axle) by virtue of the hub and axle configuration itself. The force on the inner race is provided by slightly raised portions within the hub/axle assembly—these are configured to communicate with the inner race and they translate a force to the inner race by virtue of the clamping effect provided by the way in which the hub and axle are held with respect to each other. The small raised portions (typically in the form of a lip) stop the inner race from moving relative to the axle.

In the aforementioned single cam Rockshox system a force is supplied to ensure that the inner race is stationery relative to the main axle portion of the assembly. This force is provided by a raised portion on the axle itself. As a separate action, the Rockshox assembly holds the fork legs by virtue of the expansion of a member in the axle when this member is positioned within the confines of the orifice of the closed bore dropout.

A problem associated with both of the aforementioned Rockshox systems is that, although the axle assembly is fixed to the dropouts, the rigidity of these systems is considered to be less than optimal. It is therefore desired to provide an alternative assembly for rigidly mounting a high rigidity axle in highly rigid front or rear fork systems whilst retaining the ability to remove or replace a wheel using a quick release mechanism. Not only is an alternative required, but the systems designed by Rockshox are considered to be somewhat less than optimal in that the clamping effect of the quick release cams is configured to provide a force on the axle in the direction defined by a radius extending between a point on the circumference of the axle and a point on the longitudinal axis located along the length of and at the centre of the axle. Clamping in this way means that the axle is only prevented from moving (relative to the fork or forks to which it is attached) in the longitudinal direction by virtue of the magnitude of the force applied by (a) the two cam levers (in the Tullio assembly) or (b) by the single lever in the single cam lever Rockshox system. In the sport of mountain biking high forces (especially as regards front fork systems) may potentially cause the axle in these systems to move, particularly if the cam or cams are not tightened sufficiently or if they become loosened in some way during operation of the bike. There is thus a need to provide an alternative high rigidity closed bore axle/fork assembly system that can be removed without the need for a tool to be used and which is designed so as to be removed easily and quickly.

Increasing the rigidity and strength is highly desirable in the wheel axle mountings of vehicles such as mountain bikes. For this reason closed bore dropouts have been used in conjunction with a wider diameter axle that can be secured within the closed bore dropouts. Use of closed bore dropouts is particularly desirable in bicycles with suspension forks of the type that are common on mountain bikes. Use of suspension forks can create unbalanced compressional and tensional forces in the fork legs during cornering and manoeuvering of the bicycle. This is particularly so in the case of a set of front forks which are configured to hold a wheel of the vehicle that is used for steering the vehicle. The known methods for securing larger diameter axles, commonly 20 mm in diameter, differ in design, but each suffers from either requiring specialist tools for the removal of the wheel and/or requires an excessive number of operations to be completed before the wheel can be removed by virtue of the axle being displaced longitudinally through closed-bore dropouts rather than simply being dropped out as is the case with open-bore dropouts.

SUMMARY OF THE INVENTION

An object of the present invention is to decrease the level of complication in connecting a bicycle wheel to a bicycle or bicycle fork so that a substantially closed-bore dropout can be used.

A further object of the present invention is to provide a wheel clamping assembly that enables a substantially closed-bore dropout to be used with an axle assembly that is of a quick-release type and which can be removed quickly without use of specialist tools.

A further object of the present invention is to provide an improved wheel axle that can be inserted into and removed from a hub in accordance with a simple operation that may be performed by hand and without the need for specialist tools.

A further object of the present invention is to provide an improved wheel clamping assembly that can be used to secure either a front wheel or a rear wheel of a vehicle such as a one or two-wheeled bicycle or a motorcycle or a tricycle or a motorised trike.

According to a first aspect of the present invention there is provided an axle assembly having a longitudinal axis and first and second ends, an axle portion of said axle assembly being located between said first and second ends, said axle assembly being configured for affixing to first and second structural members, at least one of said structural members comprising a substantially closed bore dropout, said substantially closed bore dropout having a first side configured for said axle portion to extend therefrom when said axle assembly is fixed to said dropout and a second side, said axle assembly comprising a first fixing means at said first end for releasably fixing said axle assembly to said first structural member and a second fixing means at said second end for releasably fixing said axle assembly to said second structural member, said axle assembly characterized in that,
said first fixing means includes a slot assembly configured to engage with an engagement pin associated with one of said structural members,
said second fixing means includes an abutment member for substantially locating against said second side of said dropout and a quick release means configured to provide a clamping force between said abutment member and the opposite end of said axle assembly, said force clamping said axle assembly to said structural members and said force acting in the direction of said longitudinal axis, said slot assembly comprises a first slot that extends transversely to a second slot, said first and second slots arranged such that, in use, one of said slots is configured to engage with said engagement pin following said axle portion being rotated about the longitudinal axis of said axle assembly by a predetermined angle, whereby, in use, said axle assembly can be released from said substantially closed bore dropout in the direction of said longitudinal axis.

Preferably, said engagement pin associated with one of said structural members protrudes into the substantially closed bore dropout thereof.

Preferably one of said fixing means is configured to be releasably passed through a wheel hub.

Preferably said quick release means comprises a lever.

Preferably said abutment member is slidably mounted relative to said axle portion of said axle assembly, the direction of sliding being in the direction of said longitudinal axis.

Preferably said quick release means comprises a lever fixed to said axle portion of said axle assembly by a cam fixing screw, said screw passing longitudinally through said abutment member and engaging with a threaded orifice in an end of said axle portion such that when said lever is rotated in a plane transverse to said longitudinal axis it rotates said screw and thereby draws said abutment member towards or away from said axle portion.

Preferably said abutment member comprises means for transferring a rotational force applied to said abutment member to said axle portion.

Preferably said force transfer means comprises at least one elongate member rigidly connected to said abutment member, said at least one elongate member communicating with a receiving orifice extending in the longitudinal direction into the end of said axle portion that is at the abutment member end of said axle portion.

Preferably said abutment member for substantially locating against said second side of said substantially closed bore dropout comprises a face having a chamfered edge for locating with the edge of the orifice of said closed bore dropout.

Preferably one of said fixing means is configured with a slot assembly configured to engage with an engagement pin associated with one of said structural members.

Preferably said fixing means comprising said slot assembly is of a smaller diameter than the diameter of said axle portion of said axle assembly, said smaller diameter thereby enabling said slot assembly fixing means to pass substantially through a wheel hub.

Preferably said slot assembly comprises a first slot that extends transversely to a second slot, said first and second slots arranged such that when said axle assembly is in use one of said slots is configured to engage with said engagement pin following said axle portion being rotated about the longitudinal axis of said axle assembly by a predetermined angle.

Preferably said predetermined angle is approximately 50°.

According to a second aspect of the present invention there is provided a wheel clamping assembly comprising first and second structural members for affixing an axle assembly thereto and an axle assembly as described in any of the preceding paragraphs, at least one of said structural members comprising a substantially closed bore dropout, said substantially closed bore dropout having a first side configured for said axle portion to extend therefrom when said axle is fixed to said wheel mounting point and a second side.

Preferably said first and/or said second structural member comprises a bicycle fork leg.

Preferably said structural members each include a substantially closed bore dropout.

According to a third aspect of the present invention there is provided an axle for use in an assembly as claimed in any of the preceding paragraphs, said axle having a slot assembly at a first end thereof, said slot assembly comprising a first slot that extends transversely to a second slot, said first and second slots arranged such that, in use, one of said slots is configured to engage with said engagement pin following said axle being rotated about the longitudinal axis of said axle assembly by a predetermined angle.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 9 schematically illustrates, in perspective exploded view, a further preferred embodiment of a wheel clamping axle assembly, the assembly comprising an end piece that the axle is to be attached to, the end piece being configured for fitment to a structure to which the axle is to be used in conjunction with;

FIG. 10 further details, in perspective view, the end piece depicted in FIG. 9; and FIGS. 11(a)-(c) further detail two dimensional planar views of the end piece depicted in FIGS. 9 and 10, FIG. 11(a) representing a side elevation view, FIG. 11(b) representing an end elevation view and FIG. 11(c) representing a sectional view in the plane (A-A) as shown in FIG. 11(b).

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
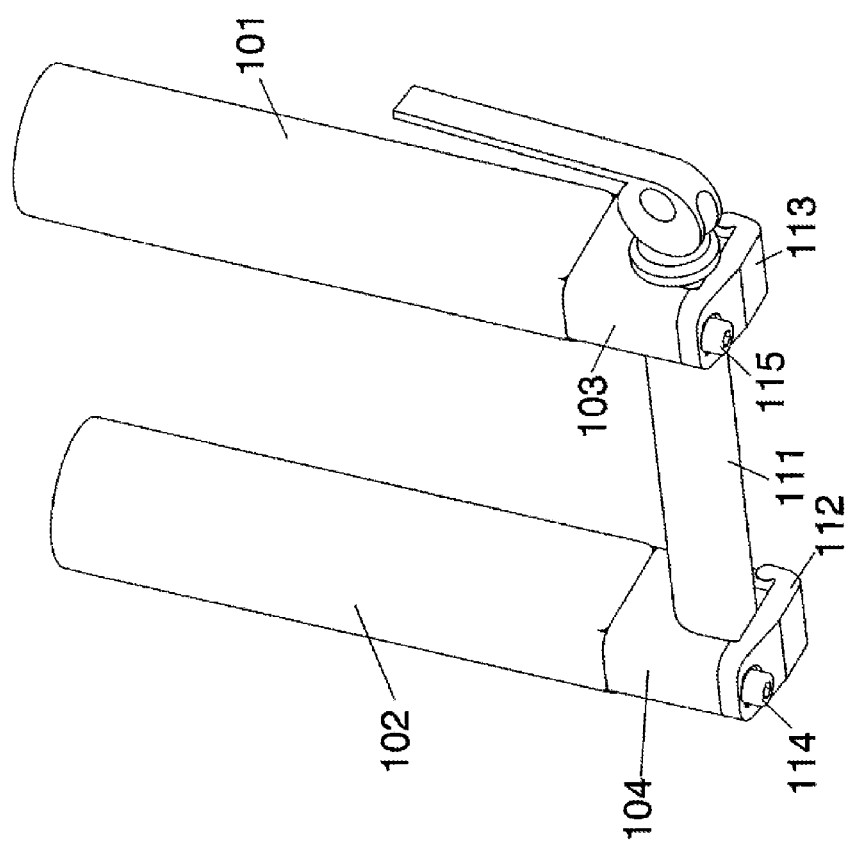
FIG. 1 schematically illustrates a known assembly for creating a closed bore type of arrangement as used with a "quick release" hub.
Figure 2:
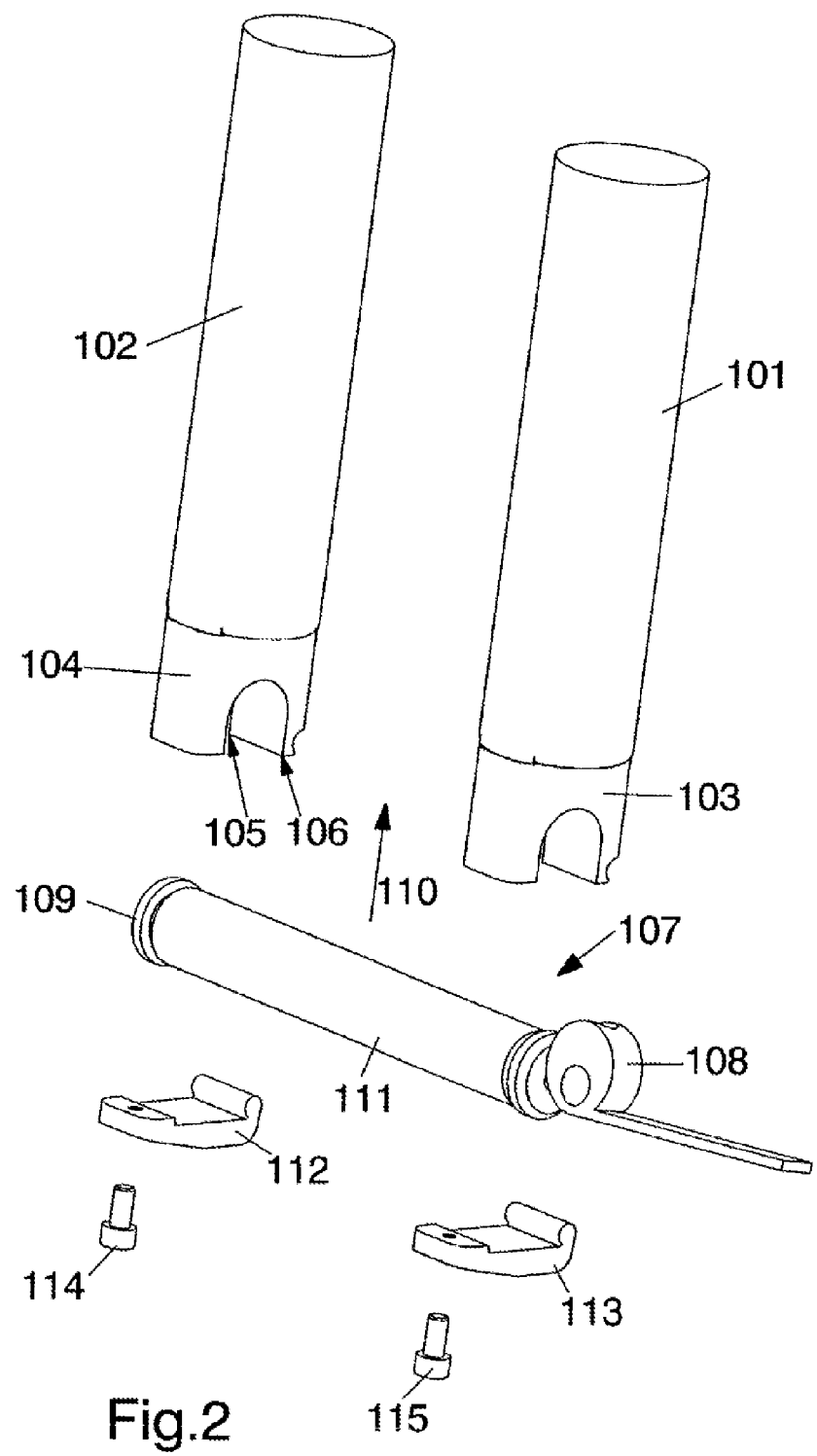
FIG. 2 schematically illustrates an exploded view of the assembly of FIG. 1.
Figure 3:
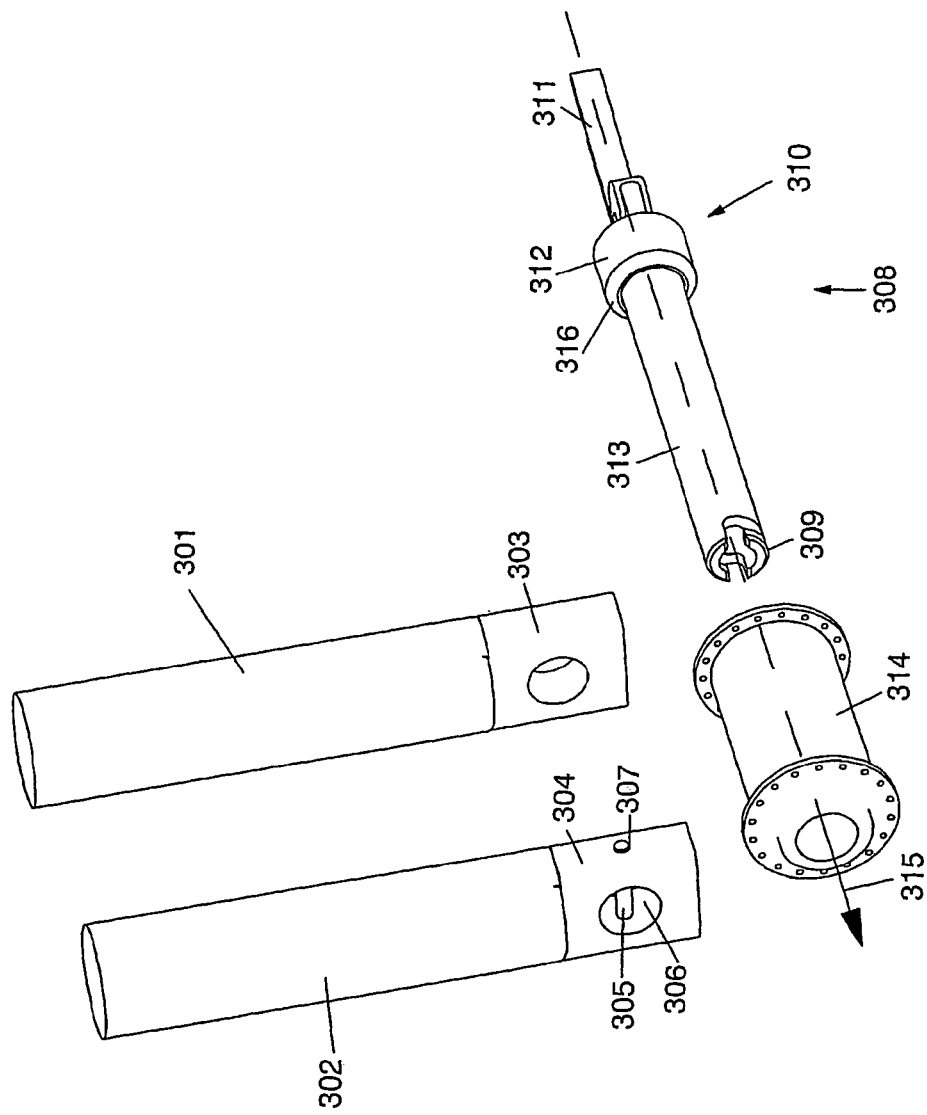
FIG. 3 schematically illustrates, in perspective view and in accordance with a preferred embodiment of the present invention, an improved axle/fork assembly as configured for use on a mountain bike.

FIG. 3 schematically illustrates, in exploded perspective view, a wheel clamping assembly in accordance with a preferred embodiment of the present invention. The assembly comprises a pair of forks, such as the front forks of a mountain bike, 301 and 302. The fork legs 301, 302 are elongate and towards the lower end, that is the end to which an axle is to be attached, each fork leg comprises a substantially (full or near) closed bore wheel mounting point 303 and 304 respectively. Fork leg 301 terminates in substantially closed bore dropout portion 303. Fork leg 302 terminates in dropout portion 304 which is configured with a protruding elongate engagement member 305 in the form of a rib or pin. Member 305 protrudes into the substantially cylindrical shaped closed bore orifice 306 that is configured within dropout portion 304. The protruding member 305 may be considered to comprise a retaining pin that is affixed to the closed bore orifice. The retaining pin may be fixed to the dropout by a suitable fixing means, such as by an interference fit as indicated at 307. Rib member 305 is preferably attached to the walls of orifice 306 at two places (i.e. at opposite ends of the rib). However it may potentially be attached at only one end. The protruding member 305 located within dropout 304 is configured to communicate with the end of an axle assembly such as the axle assembly generally indicated at 308. Axle assembly 308 comprises a first end 309 and a second end 310. End 310 comprises a quick-release cam lever mechanism, the cam lever being indicated at 311. Axle end 310 additionally comprises an abutment member 312 which, in the example shown, comprises a substantially cylindrical shaped member having a greater diameter than the main body or axle portion 313 of the axle assembly. Abutment or stop member 312 is configured with a first face to abut against dropout 303 and a second face (the base) which communicates with the cam lever mechanism. First axle end 309 is configured to be inserted into a known hub 314 in a direction generally indicated by arrow 315, arrow 315 being defined along the longitudinal axis that passes through the centre of the cylindrical shaped axle's main body 313. The fixing means at the end 309 of axle portion 313 comprises a slot assembly that is configured to receive locking pin 305 of fork leg 302, the slot assembly being configured to secure pin 305 therein. The pin 305 and slotted end 309 may suitably be described as a bayonet type of fixing assembly in that it requires a push-and-twist action to effect secured engagement of the retaining pin within the slot assembly. The retaining pin 305 prevents detachment of the structure (to which the pin is permanently affixed) from the slot assembly being effected by the simple act of pulling axle assembly 308 out of hub assembly 314. Instead a twist and pull action is required to release the pin from the slot assembly. In this way use of a fixing end comprising a screw thread (which would be prone to damage and/or difficulty of operation with accretion of dirt) can be avoided in the preferred embodiment of axle end part 309. By affixing axle assembly 308 to pin 305 a force can then be applied in a direction parallel to the longitudinal axis of the axle by virtue of operation of cam lever 311, the cam lever being used to effect a force in the longitudinal direction so as to pull the fork dropout portions 303 and 304 in a direction towards each other. The force applied is transferred via the cam lever through stopping member 312 which is configured to communicate with the outer face of dropout portion 303. The cam lever assembly is of the type known to those skilled in the art that comprises a locking ring having a seat for engaging with an eccentrically mounted cam lever to provide the locking effect.

As previously mentioned the inner portions of dropout portions 303 and 304 are the faces of the dropouts that face each other. The outer faces are the opposite sides of the dropout portions to the inner faces. To facilitate the tightening effect of cam lever 311 and to ensure rigidity of the axle and fork assembly, the stop member 312 is configured with a chamfered end that communicates with the outer face of dropout 303. The chamfer is indicated at 316 and is angled such that the stop effectively wedges into the dropout orifice of 303. Preferably, to ensure a good ft, the edge of the dropout orifice is angled to match up with the oppositely chamfered edge of the stop member 312. By virtue of the bayonet fixing arrangement the axle assembly 308 is simply removed from the hub by firstly releasing cam lever 311, secondly turning the axle assembly through a rotation of approximately 50° (to release the pin 305 from a retaining portion of the slot assembly of axle fixing means end 309) and then thirdly pulling the axle in a direction that is opposite to the direction generally indicated by arrow 315. As will be understood by those skilled in the art the exact rotation angle is dependent upon the exact configuration of the assembly and on the strength of the materials used to construct the axle and dropout portions.

Figure 4:
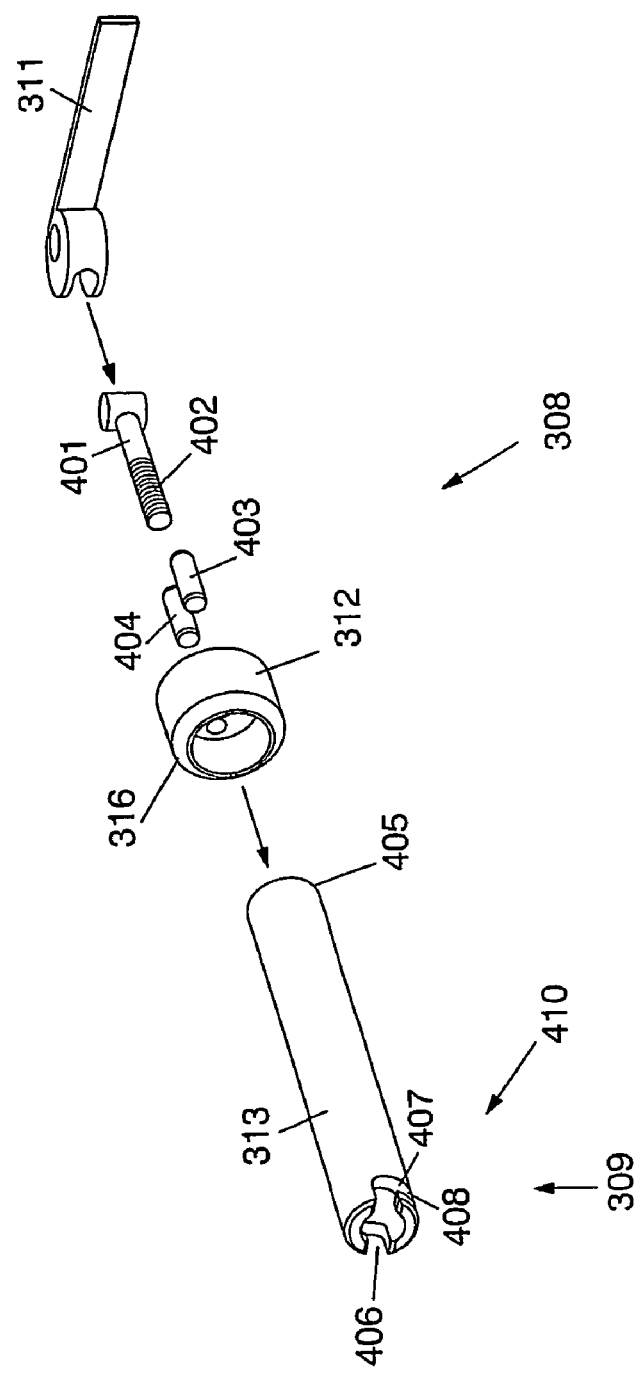
FIG. 4 further details, in exploded perspective view, the axle assembly of FIG. 3.

The axle assembly generally indicated at 308 in FIG. 3 is further schematically illustrated, in exploded perspective view, in FIG. 4 so as to more clearly illustrate the constituent parts. Cam lever 311 communicates with a cam fixing screw 401, the cam lever and fixing screw being of the type commonly known to those skilled in the art. However cam fixing screw 401 is configured to pass through the stop member 312. By virtue of screw threaded end 402 of cam fixing screw 401 being passed through a clearance hole (not shown) located centrally through the base of the stop member the fixing cam lever 311 and fixing screw member 401 can then be affixed to a drilled and tapped hole (not shown) in end 405 of axle member 313. In addition to the base of stop member 312 comprising a centrally positioned hole, stop member 312 additionally comprises a pair of internally projecting pins 403, 404 that are affixed to the base. These pins extend towards axle 313 and ultimately locate in specially configured holes in the end 405 of axle 313. The screw threaded end 402 of cam fixing screw 401 communicates with a threaded hole (not shown) located in the end 405 of axle portion 313. The pins 403 and 404 communicate with holes positioned on either side of the central screw threaded hole of axle main body 313. The communicating pins 403 and 404 are provided so that a rotational force applied to stop member 312, such as by a cyclist's fingers, may be translated to the axle portion 313. In this way such an applied force is used to rotate axle portion 313 in the operation of either securing the axle to bayonet pin 305 or removing the axle from this pin.

Towards the end of the axle main body 313 which is at the opposite end to stop 312 there is provided the fixing end 309. This cylindrical portion, in the preferred embodiment, may be of a smaller diameter than the diameter of the main cylindrical body. Although a cylindrical shape for the main body and end piece is preferred those skilled in the art will realise that various other shapes and configurations may provide the required utility. As described above, axle end 309 comprises a fixing means comprised of a slot assembly. In the preferred embodiment illustrated the slot assembly comprises of a first main slot 406 which extends into the axle end in a plane parallel to the longitudinal axis of the axle. This first slot has a main length that extends in the direction defined by the longitudinal axis of the axle. It is effectively formed by virtue of having removed two portions of the wall of the cylindrical end 309 such that the two removed portions are diametrically opposite each other. Towards the inner end of slot 406 there is provided a second slot 407.

In the best mode contemplated slot 407 extends in a direction perpendicular to slot 406 and is effectively formed by the wall of end portion 309 having been removed (e.g. cut away). Slot 407 starts at, and therefore communicates with, the inner end of slot 406. The second slot is more complex than the first in that it comprises of a first cut out portion 408 on a first side of the end piece 309 and a second cut out portion 409 (hidden) on the diametrically opposite side. The cut out portions on each side extend away from the main slot in opposite directions. Looking at the axle end from a side view indicated by directional arrow 410 the first and second slots adjoin and each form a right-angled cut-out portion in the wall of the end piece. Such a right-angle shape is commonly referred to in the field of engineering as a "dog-leg". The fact that each dog-leg cut-out on each side is the opposite of the other (in terms of the direction in which the second slot extends away from the first) provides the locking ability of the configuration. In this way the locking pin 305 may be inserted in slot 406. Following insertion of pin 305 in slot 406 a rotational force applied to rotate axle body 313 about its longitudinal axis then causes the second slot 407 to engage with the pin which is thereby locked in position. To release pin 305 from slot 407 an opposite rotational force is required to be applied so that the axle main body 313 rotates in the opposite direction to when it is rotated to secure the pin. Upon rotating the axle main body 313 by the required amount (approximately 50° in the preferred embodiment where the two slots are perpendicular to each other) the locking pin 305 is aligned with slot 406 so that axle main body 313 may simply be withdrawn from pin 305 and thereafter out of the hub from which it is located within. Slots 406 and 407 are conjoined. Slot 406 effectively turns into slot 407 and thus slot 407 could be construed as simply the end part of main slot 406.

FIGS. 5(a) to 5(e) schematically illustrate two-dimensional views of axle assembly 308. FIG. 5(a) is a side elevation view of the axle assembly 308. FIG. 5(b) is a plan view or rather a view that has been rotated through 90° about the longitudinal axis of the axle as compared with FIG. 5(a). This view shows the main slot 406 of axle body 309 as extending in the direction of the longitudinal axis of the axle. Towards the rear of the slot, that is further into the axle itself, there is formed a second slot 407 that extends in a direction perpendicular to slot 406.

FIG. 5(c) is an end elevation view of FIG. 5(a) or FIG. 5(b) and shows the cam lever and the end of the stop member 312.

FIG. 5(d) is an end elevational view of the non-cam lever end of the axle assembly, that is end 309. This is a view looking head on at the bayonet slot engagement end 309.

Figure 5:
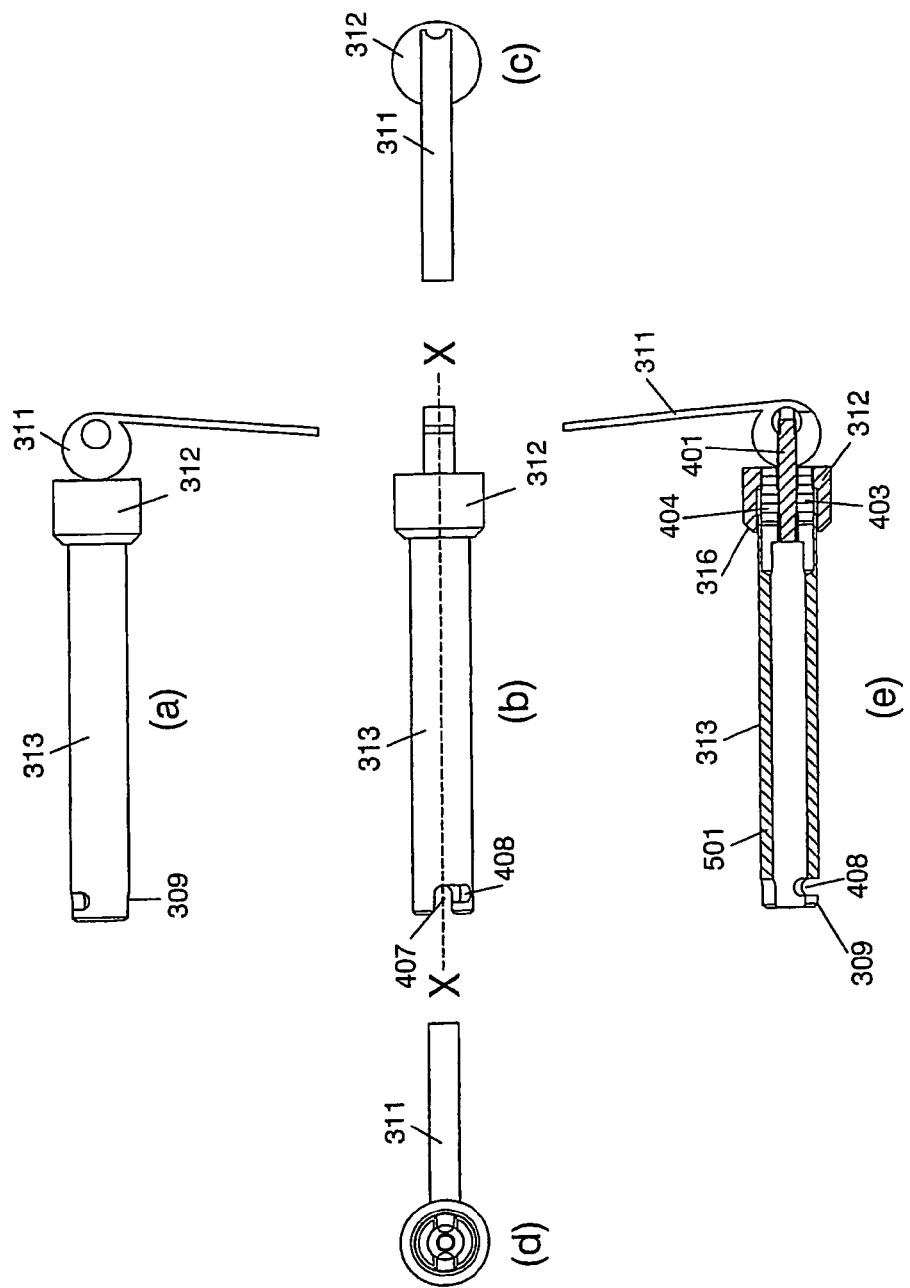
FIGS. 5(a)-(e) schematically illustrate various planar views of the axle assembly of FIGS. 3 and 4, FIG. 5(a) representing a side elevation view, FIG. 5(b) representing a plan view, FIG. 5(c) representing a first end view, FIG. 5(d) representing a second end view and FIG. 5(e) representing a sectional side elevation view along the plane defined at x-x in FIG. 5(b)

FIG. 5(e) schematically illustrates a sectional view of the axle assembly 308, the section being along the plane X-X that is indicated in FIG. 5 (b). This Figure illustrates that the main axle body 313 comprises a cylinder having a wall 501, the cylinder being substantially hollow. The hollow cylinder is not a necessary requirement, but is preferred since, as is known to those skilled in the art, a cylinder having an internal-bore is stronger for purposes of bearing weight than a solid cylindrical member of the same diameter. Use of a hollow cylinder also achieves a weight saving. The Figure further details the elongate pins 403, 404 that are attached to the stop member 312 and which extend into orifices in the cam lever end of the axle main body 313. The pin members 403 and 404 are present so that a person can, on cam lever 311 being loosened, rotate member 312 so as to effect a turning force on the axle main body 313. In this way the locking pin 305 is releasable from the bayonet pin receiving grooves or slots 406 and 407.

Figure 6:
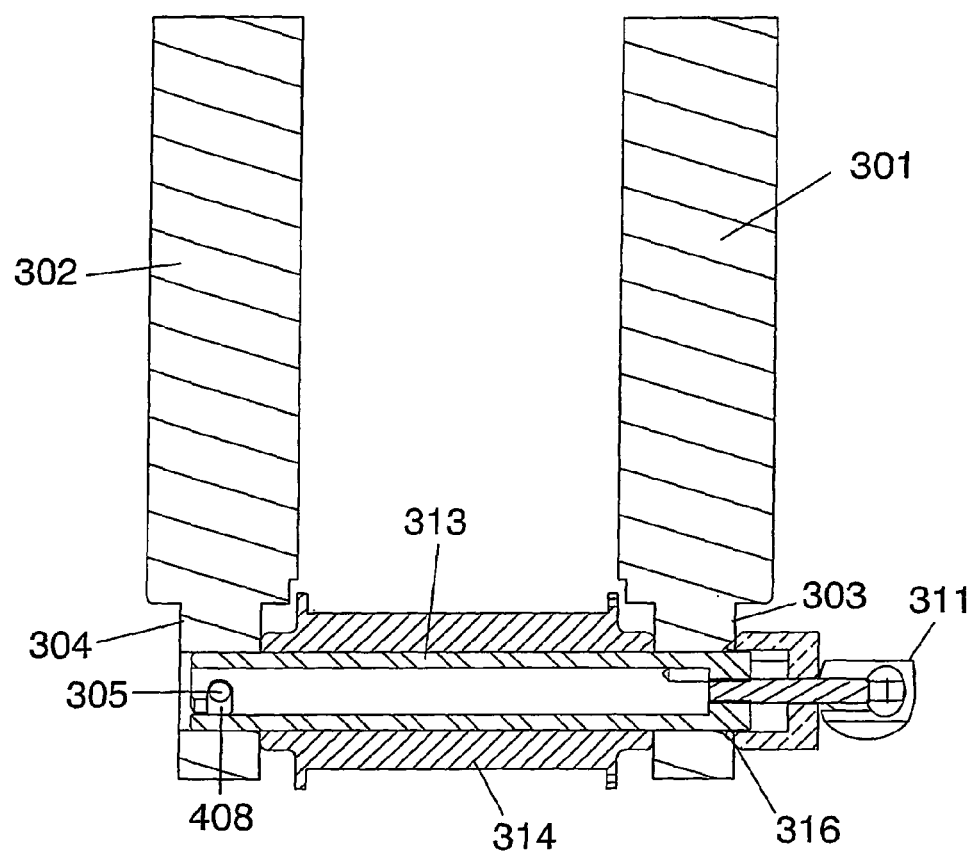
FIG. 6 schematically illustrates a sectional view of the wheel clamping assembly of FIG. 3.

FIG. 6 schematically illustrates a sectional view, in two-dimensions, of a wheel clamping assembly of the type schematically illustrated in perspective view in FIG. 3. From FIG. 6 it can be seen that axle portion 313 passes through a hollow region within hub member 314. The Figure shows locking pin 305 in its locked-in position within locking slot 407. Once locking pin 305 is in place abutment member 312 is configured to abut against the outer surface of dropout 303. By virtue of closing cam lever 311 this thereby effects a force upon slidably mounted stopping member 312 which thereby causes the axle main body 313 to pull against locking pin 305. There is therefore applied a tensional force to across the axle by virtue of stopping member 312 pulling against locking pin 305. The tensional force acts in a direction defined by the longitudinal axis of the axle. The dropout 303 comprises a first face (inner face, i.e. on the axle side) and a second face that communicates with the abutment member. The abutment member 312 exerts a force on the outer face of dropout 303 whereas at the opposite end of the axle the force is applied at the location of the pin 305 which is located within the region between the inner face and the outer face of the dropout. The force applied by the stopping member 312 may be described as being applied from the outside face of the dropout 303: Preferably stopping member 312 comprises a chamfered (that is an angled) edge (not shown) that locates in a chamfered edge (not shown) of the closed-bore orifice formed within dropout 303 so as to ensure that a rigid fit is thereby provided. The cam lever 311 is an example of a type of quick release means that is configured to provide a clamping force between the abutment member and the opposite end of the axial assembly, the force clamping the axle assembly to the forks and the force acting in the direction of the longitudinal axis of the axle. Suitably the quick release means comprises a lever as described, however other quick release means may be envisaged by those skilled in the art. The axial assembly and clamping assembly schematically illustrated in FIGS. 3 to 6, in contrast to the single cam Rockshox system described in the introductory section of the present application, is configured to provide the force required to prevent the inner race moving relative to the axle and also the force required to hold the entire clamping assembly together. The clamping is from the outside in that the abutment member is configured to impose a force upon fork leg 301 upon cam lever 311 being rotated and adjusted into its finalised fixed position wherein the fork is held suitably tightly. In FIG. 6 it is the fork leg 301 that is configured to provide the required force on the inner race in the bearings, this being provided by slightly raised portions located on the inner face of the wheel mounting point of the fork leg.

Figure 7:
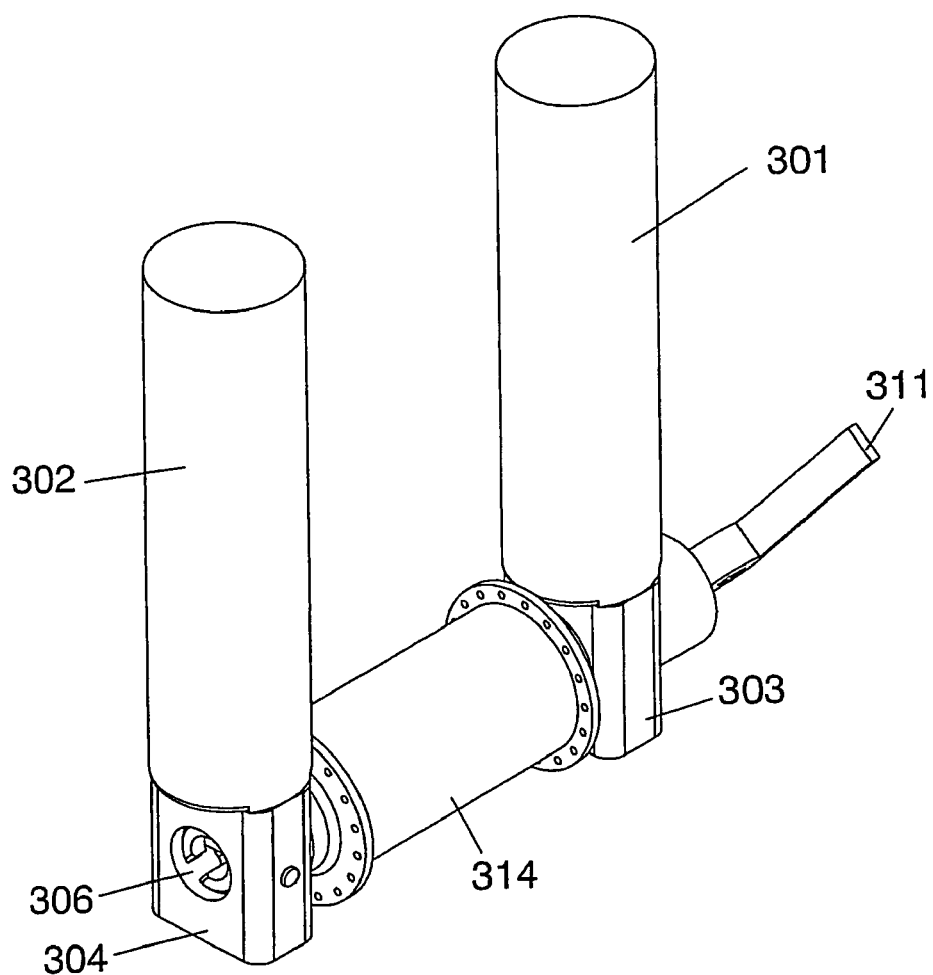
FIG. 7 schematically illustrates, in perspective view, the wheel clamping assembly illustrated in FIGS. 3 to 6, such that the axle, hub and forks are shown in position when in use on a given bicycle.

FIG. 7 schematically illustrates, in perspective view, the wheel clamping assembly illustrated in FIGS. 3 to 6, such that the axle, hub and forks are shown in position when in use on a given bicycle. However for reasons of clarity the other wheel components (e.g. the wheel rim and spokes) which would be connected to hub member 314 have not been included in this Figure. The Figure shows the closed-bore orifice 306 located in portion 304 and shows that the end of the axle assembly 308 comprising slots 406 and 407 is located within portion 304.

Figure 8:
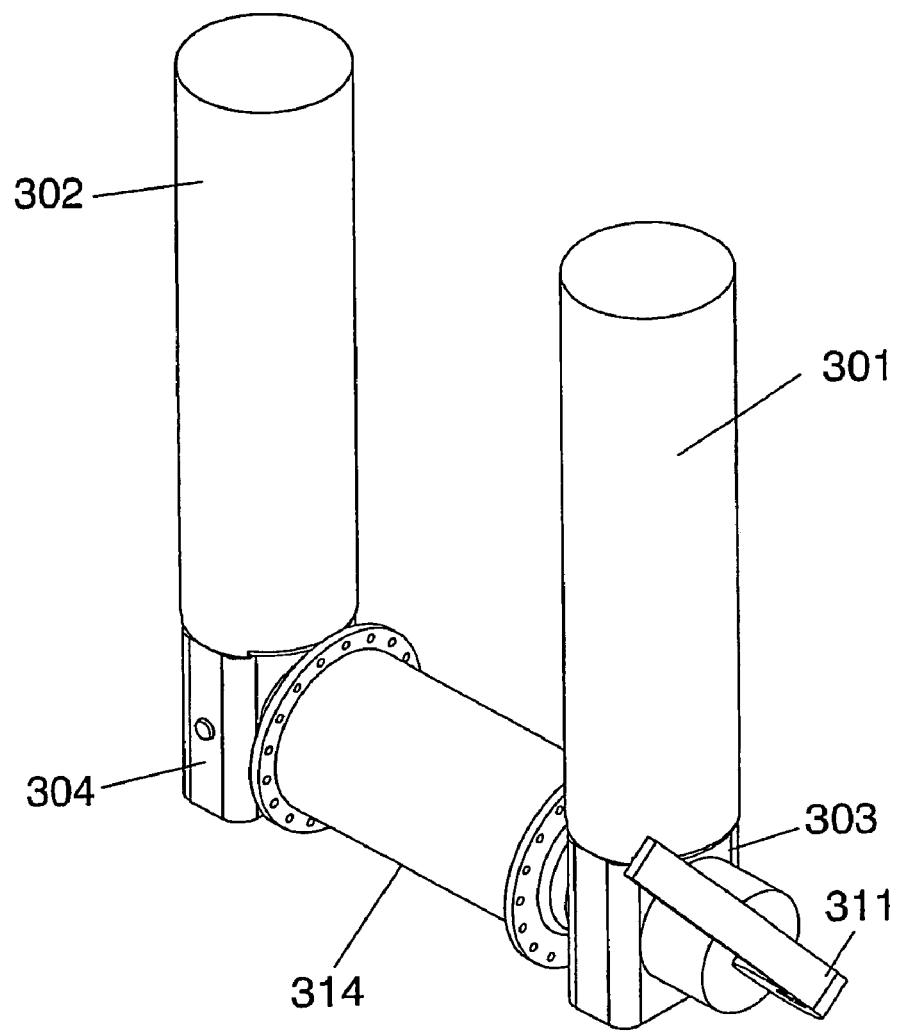
FIG. 8 schematically illustrates, in perspective view, a further view of the assembly of FIG. 7.

FIG. 8 schematically illustrates, in perspective view, a further view of the assembly of FIG. 7 with the cam lever end being in the foreground.

Figure 9:
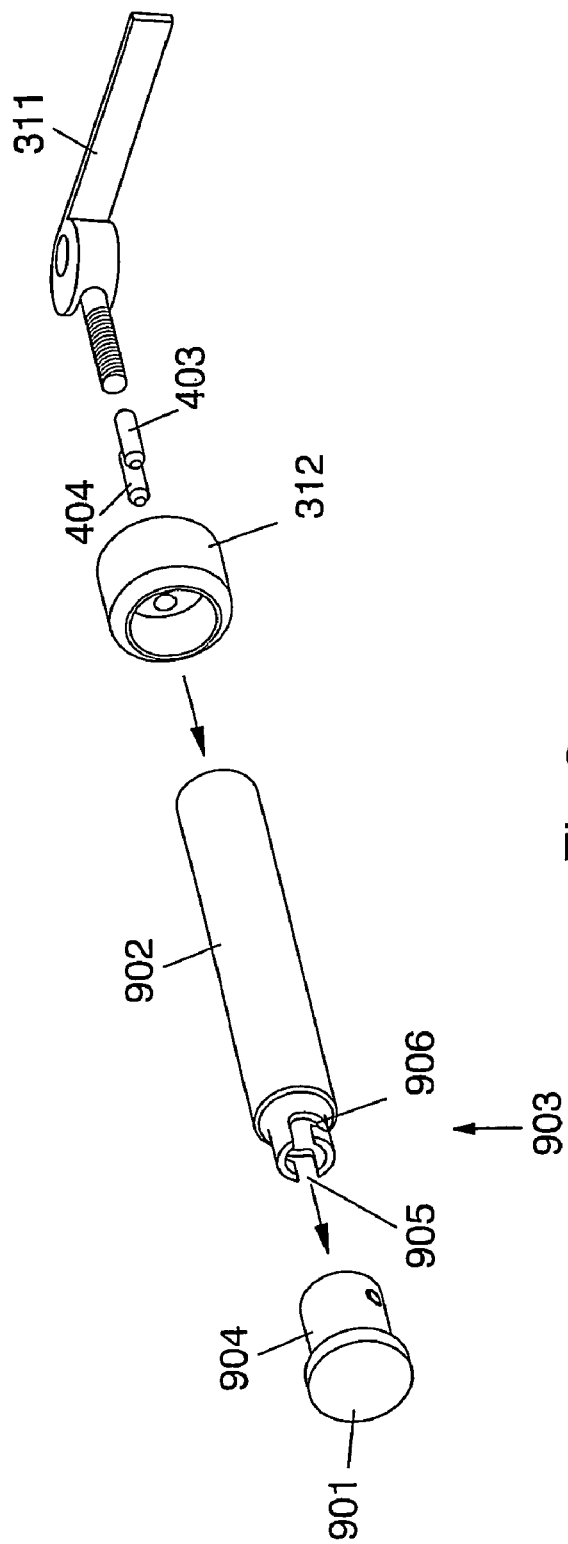

FIG. 9 schematically illustrates, in perspective exploded view, a further preferred embodiment of a wheel clamping axle assembly. The assembly comprises an end piece 901 that an axle is to be attached to, the end piece being configured for fitment to a structure to which the axle is to be used in conjunction with. The components of the main axle assembly are, in the example illustrated, substantially the same as those schematically illustrated in FIG. 4 and therefore the same numerals have been used for common components. The axle main body is indicated at 902 and this is substantially the same as the axle main body schematically illustrated in FIG. 4 (313). However the end portion (that is the end at the opposite end of the axle to the cam lever) is of a smaller diameter than the diameter of the main cylindrical body 902. The main cylindrical body forming end piece 901 is indicated at 904, this portion being hollow and of such dimension so as to snugly accept end portion 903 of axle main body 902. Axle end 903 comprises the same kind of double slot arrangement as indicated in FIG. 4 in respect of slots 406 and 407. Again a first slot is provided that extends in a direction parallel to the longitudinal axis through the main body 902, this being indicated at 905. Towards the rear of slot 905 there is provided a second slot, slot 906, that extends in a direction that is transverse (and preferably perpendicular) to slot 905.

FIG. 10 further details, in perspective view, the end piece 901 depicted in FIG. 9. The main body portion 904 of end piece 901 comprises a hollow cylinder which terminates at one end with a solid stopping member 1001 that has a greater diameter than the main body 904. The main body 904 is preferably hollow. However main body 904 comprises an engagement pin or rib that is indicated at 1002 and which extends across the centre of the body 904. Rib 1002 may be considered to comprise a bar that extends from one side of the cylinder to a point diametrically opposite on the other side. The rib is held in place by affixing to the walls of cylinder 904. This is achieved by means of holes drilled in respective sides of the walls of cylinder 904 and an interference fit (pressing) process being applied to the point of contact between the ends of the rib and the wall of the main cylinder. The rib 1002 is, as shown, set back from the entrance to cylinder 904 by a small distance, this distance representing the length from the end 903 of axle main body 902 to the centre line extending along the longitudinal length of slot 906.

FIGS. 11(*a*)-(*c*) further detail two dimensional planar views of the end piece 901 depicted in FIGS. 9 and 10. FIG. 11(*a*) represents a side elevational view, FIG. 11(*b*) represents an end elevational view and FIG. 11(*c*) represents a sectional view in the plane (A-A) as shown in FIG. 11(*b*).

End piece 901 comprising rib member 1002 enables the axle assembly of FIG. 9, comprising the cam lever, stop 312 and axle main body 902, to be locked thereto. The mechanism of locking is similar to that described in relation to locking of the axle of FIGS. 3 to 8 to locking pin 305 located in 304. The end piece 901 enables a bayonet type locking mechanism to be utilised in a wider variety of applications. The end piece is provided so that an existing structure, such as a pair of front or rear bicycle forks, can be easily modified, with the end piece being inserted in a fork location for ready connection with an axle as configured in accordance with the present invention.

The preferred embodiments of the invention described include a bayonet type locking mechanism for locking the axle assembly to either a portion of a bicycle frame or fork or for locking an axle assembly to an end piece 901 that is located in a particular structure to which the axle assembly is to be locked to. The bayonet locking mechanism is highly preferred. However those skilled in the art will understand that various other forms of fixing the axle to a structure may be readily configured. Thus, for example, instead of providing a double slot arrangement for engaging with a locking pin it is also possible to replace the bayonet end with a screw threaded male end that is configured to screw into a suitably configured female threaded end or to a suitably configured screw threaded end piece. The invention is thus not to be considered as limited to a bayonet type of locking mechanism. Similarly the invention is not to be considered as limited to an axle as used in connection with a vehicle. Thus, for example, the axle may be used to lock a wheel to a transportation structure which may, for example, be located on the back of a van. In other words a wheel carrying frame or rack may be assembled on the back of a vehicle such as a car or a van. A wheel configured with an axle assembly as configured in accordance with the present invention may then be attached to the wheel carrying assembly by virtue of the quick release axle and in particular if the axle is of the type configured to communicate with an end member, such as end member 901. In this latter case, the end member 901 acts as some form of nut to lock an end of the wheel axle to the wheel carrying frame, the cam lever then being used to tighten the axle so as to hold the wheel to the wheel carrying frame.

Those skilled in the art will appreciate that the bayonet fixing described may be used in relation to both quick release and standard axle assemblies comprising a screw thread/locking nut arrangement at one end. In this respect the bayonet aspect of the invention is not to be considered as limited to quick release type fixings.

Although the invention has been described primarily with reference to two fork legs of a bicycle, in general the invention is applicable to holding a wheel to a large number of types and configurations of structures. In general all that is required is that a first end of the axle is held to a first structure and the second end is held to a second structure. The two structures could be part of the same overall physical structure and similarly one of the structures could be a part of the wheel axle hub, this generally being a requirement for single fork bicycle wheel mounting systems.

The invention claimed is:

1. An improved axle assembly having a longitudinal axis and first and second ends, an axle portion of said axle assembly being located between said first and second ends, said axle assembly being configured for affixing to first and second structural members, at least one of said structural members having a substantially closed bore dropout, the other of the structural members having a dropout, the improvement comprising:
   (a) a slot assembly formed on the axle portion and configured to engage an engagement pin mounted to one of the structural members at its respective dropout;
   (b) an abutment member at the first end of the axle assembly for abutting a side of the other structural member that is opposite the structural member to which the pin is mounted and a quick release means for providing a clamping force between said abutment member and the second end of said axle assembly, said force clamping said axle assembly to said structural members and acting in a direction of said longitudinal axis;
   wherein said slot assembly comprises a first slot that extends transversely to a second slot.

2. The improved axle assembly in accordance with claim 1, wherein said engagement pin protrudes into the substantially closed bore dropout of the second structural member.

3. The improved axle assembly in accordance with claim 2, wherein the axle portion is configured to be releasably passed through a wheel hub.

4. The improved axle assembly in accordance with claim 3, wherein said quick release means comprises a lever.

5. The improved axle assembly as claimed in claim 4, wherein said abutment member is slidably mounted relative to said axle portion of said axle assembly, the direction of sliding being in the direction of said longitudinal axis.

6. The improved axle assembly as claimed in claim 1, wherein said quick release means further comprises a lever fixed to said axle portion of said axle assembly by a cam fixing screw, said screw passing longitudinally through said abutment member and engaging with a threaded orifice in an end of said axle portion, wherein when said lever is rotated in a plane transverse to said longitudinal axis the lever rotates said screw and thereby displaces said abutment member relative to said axle portion.

7. The improved axle assembly in accordance with claim 6, wherein said abutment member comprises means for transferring a rotational force applied to said abutment member to said axle portion.

8. The improved axle assembly in accordance with claim 6, wherein said abutment member comprises at least one elongate member rigidly connected to said abutment member, said at least one elongate member communicating with a receiving orifice extending in the longitudinal direction into the end of said axle portion that is at an abutment member end of said axle portion.

9. The improved axle assembly in accordance with claim 7, wherein said abutment member comprises a face having a chamfered edge for locating with an edge of an orifice of said respective closed bore dropout of the first structural member.

10. The improved axle assembly in accordance with claim 9, wherein said slot assembly has a smaller diameter than a diameter of said axle portion, said smaller diameter thereby enabling said slot assembly to pass substantially through a wheel hub.

11. An improved axle assembly having an axle portion with a longitudinal axis, the axle assembly being configured for affixing to first and second structural members, at least the first structural member having a substantially closed bore dropout, the improvement comprising:
  (a) an engagement pin mounted to the first structural member at the substantially closed bore dropout;
  (b) a slot assembly on a first end of the axle portion configured to receive the engagement pin for removably mounting the axle portion to the engagement pin;
  (c) an abutment member on the axle portion for seating against a first side of the second structural member; and
  (d) a quick release on the axle portion configured to provide a clamping force between the abutment member and the first end of the axle portion, the clamping force clamping the axle assembly to the structural members with the force acting in a direction substantially along the longitudinal axis.

12. The improved axle assembly in accordance with claim 11, wherein the slot assembly includes a first slot and a second slot extending substantially transversely to the first slot.

13. An improved bicycle axle assembly having an axle portion with a longitudinal axis, the axle assembly configured to mount to first and second bicycle frame legs, each of the bicycle frame legs having a substantially closed bore dropout, the improvement comprising:
  (a) an engagement pin rigidly mounted in the closed bore dropout of the first bicycle frame leg;
  (b) a slot assembly at a first end of the axle portion, the slot assembly including a first slot extending substantially longitudinally along the axle portion and configured to receive the engagement pin during longitudinal insertion of the axle portion through the closed bore dropout of the first bicycle frame leg, a second slot extending substantially transversely to the first slot and configured to receive the engagement pin during rotation of the axle portion through a predetermined angle for removably mounting the axle portion to the engagement pin;
  (c) an abutment member longitudinally movably mounted to the axle portion for seating against a side of the second bicycle frame leg opposite the first bicycle frame leg; and
  (d) a quick release on the axle portion for providing a clamping force along the longitudinal axis between the abutment member and the second slot for clamping the bicycle axle assembly to the first and second bicycle frame legs.

14. The improved axle assembly in accordance with claim 13, wherein said predetermined angle is approximately 50°.

15. The improved bicycle axle assembly in accordance with claim 13, wherein the slot assembly further comprises a third slot that extends substantially longitudinally along the axle portion and a fourth slot extending substantially transversely to the third slot, the third slot configured to receive the engagement pin during longitudinal insertion of the axle portion through the closed bore dropout of the first bicycle frame leg, and the fourth slot configured to receive the engagement pin during rotation of the axle portion through a predetermined angle for removably mounting the axle portion to the engagement pin.

16. A method of affixing an axle assembly to first and second structural members, the axle assembly having an axle portion with a longitudinal axis, at least the first structural member having a substantially closed bore dropout, the method comprising:
  (a) aligning a first slot, formed in a first end of the axle portion and extending substantially longitudinally along the axle portion, with an engagement pin mounted to the first structural member in the closed bore dropout;
  (b) inserting the first end of the axle portion through the closed bore dropout of the first structural member to insert the engagement pin into the first slot;
  (c) displacing the axle portion longitudinally a predetermined distance to align the pin with a second slot extending substantially transversely to the first slot;
  (d) rotating the axle portion through a predetermined angle to insert the engagement pin in the second slot, for removably mounting the axle portion to the engagement pin;
  (e) abutting an abutment member moveably mounted on the axle portion against a first side of the second structural member; and
  (f) tightening a quick release on the axle portion, thereby providing a clamping force between the abutment member and the first end of the axle portion, the clamping force clamping the axle assembly to the structural members with the force acting along the longitudinal axis.

17. An improved wheel clamping assembly including first and second spaced structural members, each structural member having a closed bore dropout, for affixing an axle assembly thereto, said axle assembly having a longitudinal axis and first and second ends, said axle assembly configured for rotatably mounting a wheel and hub assembly on an axle portion of said wheel clamping assembly, said axle portion being located between said first and second ends, the first structural member's dropout having a first side and a second side, the first side being configured for said axle portion to extend therefrom when said axle is fixed to said first structural member's dropout, the improvement comprising:
(a) said axle assembly having a first fixing means at said first end for releasably fixing said axle assembly to said first structural member and a second fixing means at said second end for releasably fixing said axle assembly to said second structural member;
(b) said second fixing means is configured to releasably fix said axle assembly to said second structural member following said axle portion being rotated about the longitudinal axis of said axle assembly;
(c) said first fixing means includes an abutment member slidably mounted to said axle portion for sliding relative to the axle portion in the direction of said longitudinal axis, thereby substantially locating the abutment member against said second side of said first structural member's dropout;
(d) a quick release means for providing a clamping force between said abutment member and the second fixing means at the opposite end of said axle assembly as the abutment member, said force thereby clamping said axle assembly by compressing said structural members toward one another with the clamping force acting on the structural members in a direction substantially along said longitudinal axis, whereby the axle assembly is configured to be removed from said closed bore dropouts in a direction parallel to said longitudinal axis; and
wherein one of said fixing means is configured with a slot assembly on the axle portion that is configured to receive an engagement pin mounted to one of said structural members at a respective closed bore dropout for removably mounting the axle portion to the engagement pin.

18. The improved wheel clamping assembly in accordance with claim 17, wherein said fixing means comprising said slot assembly is of a smaller) diameter than the diameter of said axle portion of said axle assembly, said smaller) diameter thereby enabling said slot assembly fixing means to pass substantially through a wheel hub.

19. The improved wheel clamping assembly in accordance with claim 17, wherein said slot assembly comprises a first slot that extends transversely to a second slot, said first and second slots arranged such that, when said axle assembly is in use, one of said slots is configured to engage with said engagement pin following said axle portion being rotated about the longitudinal axis of said axle assembly by a predetermined angle.

20. The improved wheel clamping assembly in accordance with claim 19, wherein said predetermined angle is approximately 50°.

21. The improved wheel clamping assembly in accordance with claim 19, wherein said second slot extends in a direction that is perpendicular to said first slot.

22. The improved wheel clamping assembly in accordance with claim 17, wherein said slot assembly and said engagement pin provide a bayonet fixing.

23. The improved wheel clamping assembly in accordance with claim 22, wherein said engagement pin is configured as a part of a cylindrical shaped body.

24. The improved wheel clamping assembly in accordance with claim 17 wherein said first fixing means comprises one of the components of a bayonet fixing, said one component being configured to engage with another component of a bayonet fixing associated with said second structural member.

25. An improved wheel clamping assembly including first and second spaced structural members, each structural member having a closed bore dropout, for affixing an axle assembly thereto, said axle assembly having a longitudinal axis and first and second ends, said axle assembly configured for rotatably mounting a wheel and hub assembly on an axle portion of said wheel clamping assembly, said axle portion being located between said first and second ends, the first structural member's dropout having a first side and a second side, the first side being configured for said axle portion to extend therefrom when said axle is fixed to said first structural member's dropout, the improvement comprising:
(a) said axle assembly having a first fixing means at said first end for releasably fixing said axle assembly to said first structural member and a second fixing means at said second end for releasably fixing said axle assembly to said second structural member;
(b) said second fixing means is configured to releasably fix said axle assembly to said second structural member following said axle portion being rotated about the longitudinal axis of said axle assembly;
(c) said first fixing means includes an abutment member slidably mounted to said axle portion for sliding relative to the axle portion in the direction of said longitudinal axis, thereby substantially locating the abutment member against said second side of said first structural member's dropout;
(d) a quick release means for providing a clamping force between said abutment member and the second fixing means at the opposite end of said axle assembly as the abutment member, said force thereby clamping said axle assembly by compressing said structural members toward one another with the clamping force acting on the structural members in a direction substantially along said longitudinal axis, whereby the axle assembly is configured to be removed from said closed bore dropouts in a direction parallel to said longitudinal axis; and
wherein said abutment member comprises means for transferring a rotational force applied to said abutment member to said axle portion and said force transfer means comprises at least one elongate member rigidly connected to said abutment member, said at least one elongate member communicating with a receiving orifice extending in the longitudinal direction into the end of said axle portion that is at the abutment member end of said axle portion.

* * * * *